(12) United States Patent
Kluftinger et al.

(10) Patent No.: US 12,264,975 B2
(45) Date of Patent: Apr. 1, 2025

(54) DEVICE FOR DETERMINING A TEMPERATURE

(71) Applicant: Knorr-Bremse Systeme Fuer Nutzfahrzeuge GmbH, Munich (DE)

(72) Inventors: Andre Kluftinger, Kleinheubach (DE); Andreas Windisch, Unterhaching (DE); Felix Thierfelder, Unterschleissheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 164 days.

(21) Appl. No.: 17/760,415

(22) PCT Filed: Jan. 28, 2021

(86) PCT No.: PCT/EP2021/051975
§ 371 (c)(1),
(2) Date: Aug. 9, 2022

(87) PCT Pub. No.: WO2021/165009
PCT Pub. Date: Aug. 26, 2021

(65) Prior Publication Data
US 2023/0124590 A1    Apr. 20, 2023

(30) Foreign Application Priority Data

Feb. 18, 2020 (DE) .................... 10 2020 104 194.2

(51) Int. Cl.
*G01K 13/08* (2006.01)
*B60T 17/22* (2006.01)
(Continued)

(52) U.S. Cl.
CPC .............. *G01K 13/08* (2013.01); *B60T 17/22* (2013.01); *G01K 7/42* (2013.01); *F16D 2066/001* (2013.01); *G01K 2217/00* (2013.01)

(58) Field of Classification Search
CPC ...... G01K 13/08; G01K 7/42; G01K 2217/00; B60T 17/22; F16D 2066/001
(Continued)

(56) References Cited

U.S. PATENT DOCUMENTS

| | | | |
|---|---|---|---|
| 2010/0301332 A1* | 12/2010 | Dibra | G01K 7/42 257/E23.079 |
| 2018/0174441 A1 | 6/2018 | Hainz et al. | |
| 2023/0173980 A1* | 6/2023 | Sin | B60R 16/02 340/686.1 |

FOREIGN PATENT DOCUMENTS

| | | |
|---|---|---|
| DE | 38 03 597 A1 | 8/1989 |
| DE | 10 2009 000 593 A1 | 8/2010 |

(Continued)

OTHER PUBLICATIONS

International Search Report dated May 10, 2021 for PCT/EP2021/051975.
(Continued)

*Primary Examiner* — Kam Wan Ma
(74) *Attorney, Agent, or Firm* — NORTON ROSE FULBRIGHT US LLP; Gerard A. Messina

(57) ABSTRACT

A device for determining temperature information from a sensor device, which is configured to transmit sensor information by time-limited electrical pulses according to a defined protocol, including: a data processing unit configured to perform the following: retrieving reference data relating to a relationship between a pulse duration of the electrical pulses and thermal effects in the sensor device; measuring the pulse duration at at least one of the electrical pulses; and determining the temperature information on the (Continued)

basis of at least one result of the measurement and the reference data. Also described are a related sensor system, a related vehicle, related methods, and a computer readable medium.

12 Claims, 3 Drawing Sheets

(51) Int. Cl.
    *F16D 66/00*     (2006.01)
    *G01K 7/42*     (2006.01)
(58) Field of Classification Search
    USPC ........................................................ 340/449
    See application file for complete search history.

(56) References Cited

FOREIGN PATENT DOCUMENTS

| | | |
|---|---|---|
| EP | 1211500 A1 | 6/2002 |
| JP | H5031906 B2 | 9/2012 |
| WO | 2004027433 A1 | 4/2004 |

OTHER PUBLICATIONS

"Requirement Specifications for Standardized Interface for Wheel Speed Sensors with Additional Information—'AK-Protocol' Version: 4.0" by Verband der Automobilindustrie VDA and Daimler AG, Feb 13, 2008.

\* cited by examiner

DEVICE FOR DETERMINING A TEMPERATURE

FIELD OF THE INVENTION

The present invention relates to a device and a method for determining a temperature using a pulse width in a data transmission from a sensor, and relates in particular to temperature sensing in an active speed sensor.

BACKGROUND INFORMATION

Data may be transmitted from a sensor by a sequence of time-limited electrical pulses according to a defined data transmission protocol. For example, a protocol which was published under the authorship of the Verband der Automobilindustrie VDA [German Association of the Automotive Industry] and Daimler AG as a recommendation of the VDA with the title "Requirement Specifications for Standardized Interface for Wheel Speed Sensors with Additional Information—AK-Protocol Version: 4.0" on Feb. 13, 2008 is used in active speed sensors in automobiles and commercial vehicles. The protocol transmits sensor data with the aid of Manchester encoding by two current intensities, in which case information relating to speed, direction of rotation, air gap and sensor condition is output. The AK protocol does not provide, in particular, for any transmission of information relating to the temperature in the sensor—even when the sensor itself captures such a temperature, for example by its own internal sensor. This rules out the transmission of temperature information from the speed sensor without using further hardware or rejecting or modifying the given standard.

However, in cases such as that described above, there is a need for a measured value of a temperature from the speed sensor and/or its environment. For instance, control apparatuses in the region of brake systems or general parts of the vehicle electronics may need an indication of the temperature in the bearing on a commercial vehicle axle or on a trailer. In this case, the most accurate possible indication of a temperature in the speed sensor or in its environment or a warning in the event of an excessively high temperature may be desirable, for example. However, on account of technical boundary conditions or for reasons of costs or efficiency, further sensors or components for directly measuring a temperature and rejection of established data transmission protocols should be avoided.

SUMMARY OF THE INVENTION

At least some of the problems mentioned may be solved by a device as described herein, a sensor system as described herein, a vehicle as described herein, a method as described herein, a method as described herein and a computer program product as described herein. The further embodiments define further advantageous embodiments of the subjects of the main descriptions and embodiments herein.

The present invention relates to a device for determining temperature information from a sensor device which is configured to transmit sensor information by time-limited electrical pulses according to a defined protocol. The device is characterized by a data processing unit which is configured to measure a pulse duration of the electrical pulses at at least one of the electrical pulses. Such a pulse duration may be defined by the protocol, in particular. The data processing unit is also configured to retrieve reference data relating to a relationship between the pulse duration and thermal effects in the sensor device and to determine the temperature information on the basis of at least one result of the measurement and the reference data.

In this case, the temperature information may be a value, for example, or, for instance, a change or rate of increase of a temperature or of a temperature range inside or in the vicinity of the sensor device. The sensor device necessarily comprises at least one sensor, which outputs detected data as sensor information, and a device or module for translating the output sensor information into the transmission protocol. Transmission is effected by a suitable electrical connection, for example a power line. The protocol may be, in particular, the already mentioned AK protocol or, for example, a transmission scheme which codes the sensor information itself by a pulse width. Exemplary embodiments provide, in particular, for the transmitted sensor information to not contain the temperature information itself. However, this restriction is not necessary for an advantageous application. Rather, the temperature information may be both determined in the device by the data processing unit and included in the sensor information, for example, and may therefore be redundantly present. The device may therefore use the temperature information, for instance, for the purpose of monitoring a functionality of the sensor.

A measurable and reproducible relationship between the pulse duration of the electrical pulses and thermal effects in such sensor devices has been observed. This relationship may collectively arise as a result of dependences of the method of operation on electrical circuit components or semiconductor components present in the sensor device, which dependences are not specifically determined in more detail; in particular, PN junctions in diodes, transistors or oscillators respectively exhibit a temperature drift. This temperature drift or the effect on the pulse width resulting from a multiplicity of components is used by the device to draw conclusions regarding the temperature in the sensor.

In addition to the data processing unit, the device may comprise further components or connecting elements. In exemplary embodiments, the data processing unit is integrated in a control apparatus of a brake system for a vehicle, for example.

The configuration of the device for retrieving reference data can be interpreted broadly. Reference data may thus be stored, for example in the form of lists, tables (or look-up tables), characteristic curves or functions, in a storage unit of the device. Irrespective of this, however, the retrieval of reference data may also comprise, for instance, transmission of a comparison temperature, a measurement, and/or storage thereof. For example, the device may have access to one or more values of gradients for a relationship, linear at least in sections, between a temperature in or at the sensor device and the pulse width which are stored, may obtain and store a reference point for determining the temperature, for example by measuring the pulse width at predefined times, in order to then calculate a temperature from pulse widths measured between the predefined times on the basis of said stored reference data.

The reference data optionally have at least one of the following features:
the reference data specify, for at least one pulse duration of the electrical pulses, a temperature assigned to the pulse duration,
the reference data specify a linear relationship between a temperature and the pulse duration of the electrical pulses (for example using a gradient value), the reference data specify a quantized (for example in sections) or non-linear relationship between a temperature and the pulse duration of the electrical pulses, the reference data specify sensor-dependent correction data which define deviations of the sensor device from a predefined relationship between a temperature and the pulse duration of the electrical pulses.

In this case, the reference data, in particular in the form of a list or a table, may consist of pulse width values and correlated temperature or correction values, but, independently of this or in combination with this, may also define, for example, a characteristic curve for a temperature in an abstract manner, for example as already mentioned in the form of a gradient value or a rate of change for a linear relationship. The temperature information can be converted or determined from the measurement of the pulse width over a complete or restricted temperature or pulse width range.

The data processing unit is optionally configured, after determining the temperature information, to compare this temperature information with at least one threshold value and to trigger at least one alarm after the threshold value has been exceeded.

In this case, the warning function may be used, for instance, to monitor the temperature in the vicinity of a sensor, for example in a commercial vehicle, and to output warnings in the case of higher temperatures (for example if 180° C. is exceeded in an axle of a commercial vehicle) once or in stages.

Exemplary embodiments also relate to a sensor system having a speed sensor for determining a speed in a vehicle. The sensor system is configured to transmit sensor information from the speed sensor by time-limited electrical pulses according to a defined protocol, and is characterized by a device for determining temperature information from the speed sensor or from an environment.

In this case, sensor information is optionally transmitted according to a protocol which itself does not provide for any transmission of temperature information. In particular, this protocol may be the already mentioned protocol "Requirement Specifications for Standardized Interface for Wheel Speed Sensors with Additional Information—AK-Protocol Version: 4.0". The embodiment according to the invention is optionally also suitable for other sensor protocols such as PSI5 (Peripheral Sensor Interface 5).

Exemplary embodiments also relate to a vehicle characterized by at least one sensor system of this type.

In particular, such sensor systems can be used in commercial vehicles or trailers in which speed sensors for measuring speeds of wheels are integrated. In this case, the data from a speed sensor are transmitted to control apparatuses of the brake system, for example. In this case, there is interest in monitoring the temperature in the bearing of the wheel being monitored on the commercial vehicle axle or the trailer, for example. The temperature in the bearing can be inferred with the aid of the device by monitoring the temperature in the speed sensor. As already mentioned, active speed sensor devices sometimes themselves have internal temperature sensors, but the associated information is not available via the AK protocol which is often used in this field. The presented solution means that temperature information from the speed sensor is available without departing from the standard of the protocol or using additional hardware on the sensor device or in the vicinity of the latter.

The data processing unit is optionally configured to include a predefined systematic correction in the determination of the temperature information in order to determine the temperature at a predefined position in the vehicle in the vicinity of the speed sensor.

As already mentioned above, such a predefined position may be located, for example, in the bearing of a commercial vehicle axle. The rule for correcting the temperature information determined from the pulse width may be programmed into the data processing unit, for instance, or may be stored in the form of a further list or table, for example in the reference data.

Exemplary embodiments also relate to a method for measuring temperature information from a sensor device which is configured to transmit sensor information to a receiver by time-limited electrical pulses according to a defined protocol, wherein the receiver has reference data relating to a relationship between a pulse duration of the electrical pulses and thermal effects in the sensor device. The method is characterized by the steps of measuring the pulse duration at at least one of the electrical pulses;

determining the temperature information from at least the measured pulse duration and the reference data.

As mentioned above, the temperature information can also be determined indirectly or with the aid of a correction in this case. The receiver may itself store the reference data or may retrieve them from a remote memory by a transmission.

Exemplary embodiments also relate to a method for generating reference data relating to a relationship between a pulse duration of time-limited electrical pulses and thermal effects for a sensor device which is configured to transmit sensor information to a receiver by such electrical pulses and is heated during a production method, for example during encapsulation with a plastic, and subsequently cooled. The method comprises the steps of providing a sensor device during a production method;

providing a receiver which is configured to receive the sensor information and gauge the pulse duration;

repeatedly transmitting sensor information from the sensor device to the receiver and, at the same time, continuously measuring at least one temperature in the sensor device during heating, for example during encapsulation with the plastic, and subsequent cooling;

gauging the relationship between the pulse duration and thermal effects in the sensor device on the basis of the transmitted sensor information and the measurement of the temperature in the sensor device;

determining the reference data from at least one result of the gauging process.

Since the sensor is encapsulated by a plastic during production, it is directly possible during production to compare the temperature in the sensor with the pulse width. In this case, the content of the sensor information is not important. A direct advantage of the method arises, in particular in the case of speed sensor systems intended for commercial vehicles, from the direct possibility of including it in the production process;

no further temperature chambers are needed for calibration. A sensor-characteristic characteristic curve is therefore produced, for example, solely using the encapsulation and cooling process.

For the time between the production of the sensor device and its installation, for instance in a vehicle, the reference data may be stored, for example, in a database or—if there is an internal sensor memory—in the sensor itself. In the automotive sector in particular, speed sensors often have a customer-specific memory area which can be used for this purpose. Discrete measurement series can be improved using computing operations in the data processing unit or in further elements of the device, for example by interpolations or extrapolations which are linear or polynomial in sections.

The data can be transmitted to the data processing unit or to a storage element of the device, for example as part of a functional test in the automotive sector, for example during an end-of-line test. In the automotive sector in particular, transmission from the sensor memory or by accessing a central database is also appropriate in workshops. In this manner, it is still possible to sense a temperature even if the sensor in the vehicle is replaced.

The determination of the reference data optionally includes at least one of the following steps:
- averaging results of repeated gauging of the relationship between the pulse duration and the thermal effects for a sensor device,
- averaging results of a process of gauging the relationship between the pulse duration and the thermal effects for a plurality of sensor devices,
- determining a functional dependence for the relationship between the pulse duration and the thermal effects by an equalization calculation.

These steps are important, in particular, for creating a merely sensor-type-specific characteristic curve for embodiments which are stored in the data processing unit in order to be improved and/or completed, possibly by sensor-specific correction or supporting data.

Exemplary embodiments also relate to a computer program product having software code stored thereon, which, when the software code is executed by a data-processing machine, is provided for the purpose of carrying out a method for measuring temperature information from a sensor device, as described above.

Some advantageous uses and embodiments are summarized below:

Transmission protocols for sensor information, for example from speed sensors, which do not provide for temperature transmission are used, in particular, in the automotive industry in brake systems. This is the case, in particular, for the AK protocol. It is just as complicated to fit further hardware, for instance further electrical lines or further temperature sensors, as it is to change the protocol. This is the starting point for the basic idea of using effective widening of electrical pulses transmitted by the sensor device, which arises as a result of thermal movement in the sensor device. The temperature in the sensor or in the vicinity of the latter can be inferred by a comparison with stored reference data relating to the temperature-dependent pulse widening.

One field of application is in systems which, as already mentioned, transmit data according to the AK protocol. However, protocols which themselves work with modulation of the pulse width are also not excluded a priori from use of the basic idea described above. A standard pulse width modulation (PWM) protocol provides a period length which is signaled in each case by a starting pulse for marking the beginning of a period, for example. This period may also change as a result of thermal effects and would therefore be open to a measurement of the temperature according to the basic idea described above.

In an extension of the field of application, temperatures in the vicinity of the sensor can be systematically inferred from the measurement of the pulse width, for example. This plays a role, for example, in brake systems in which the temperature in an axle bearing of the wheel is of interest, rather than the temperature of the speed sensor of a braked wheel. The structural arrangement of the speed sensor requires correlation of the temperature in the bearing with the temperature in the speed sensor. Correction values, for example, can be determined by controlled gauging of the pulse width for different temperatures in the bearing, which correction values are included in the reference data or in the determination of the temperature.

In a similar manner, a temperature gradient or a temperature profile, for example, can be determined by determining the temperatures of sensor devices at a plurality of positions which are arranged in a fixed manner relative to one another.

Finally, exemplary embodiments are also appropriate for a redundant temperature determination, for example if the sensor has already measured a temperature and transmitted it in the sensor information. Here, the present method which is independent of the configuration of the sensor for measuring and transmitting a temperature can be used, for instance, to monitor the functionality of the sensor. The temperature or temperature information can therefore be transmitted from the optionally already present temperature sensor using pulse width modulation or another transmission protocol (for example together with other information). During pulse width modulation, the widths of the individual pulses are specifically changed in a predetermined manner. However, temperature changes result in these predetermined pulse width changes nevertheless changing in a temperature-dependent manner, and further exemplary embodiments use this as additional temperature capture. An advantage of this is that the two temperature capture operations can effectively take place at a different location if, for example, the temperature sensor is located at a different location than the pulse width modulation electronics. A temperature gradient or a temperature profile (that is to say a spatial dependence of the temperature) can also be determined hereby.

The following scheme, for instance, can be used as an example of an implementation of the methods described above using the example of brake systems in vehicles:
- A sensor is heated and cooled, advantageously during its production method; in this case, the specific sensor parameters for the dependence of the transmission pulse width on the temperature are recorded;
- correction parameters, for example if there is a sensor-type-specific characteristic curve, are calculated from the recorded data and are stored in the sensor data memory and/or in a database;
- if the sensor is installed, the correction parameters are retrieved by reading them either from the sensor memory or from the database and are stored in a control unit connected to the sensor. Alternatively, only a characteristic curve or standard parameters may be used in the control apparatus in the case of less accurate measurement requirements;
- the control unit is configured to measure the pulse width and can therefore infer the temperature at the sensor or in the bearing. In this case, it can correct, in particular, temperatures determined only on the basis of standard relationships with the aid of the stored correction parameters;
- the control unit can also output warnings for temperatures above predefined thresholds, in particular for the bearing.

The implementation of a pure warning threshold can follow the following steps, for example for a commercial vehicle in which a speed sensor measures the speed of a wheel and in which a temperature at the sensor or at the wheel axle close to the sensor is intended to be monitored:

The commercial vehicle is switched off overnight, for example, with the result that the temperature in the sensor, at the axle or in the brake system is adjusted;

by transmitting information from the sensor, the device can determine a reference point for the correlation of the pulse width with the temperature, for instance by measuring the pulse width and comparing it with external temperature information;

with the aid of a gradient value for a linear relationship between the pulse width and the temperature, which gradient value is available to the data processing unit as a reference data item, the pulse width can be correlated with a temperature during subsequent operation. A warning can then be output in the case of a temperature of 180° C. (for example accordingly for a pulse duration of 55 µs), for example.

The exemplary embodiments of the present invention are better understood from the following detailed description and the accompanying drawings of the different exemplary embodiments which, however, should not be understood such that they restrict the disclosure to the specific embodiments, but rather are used merely for explanation and understanding.

BRIEF DESCRIPTIONS OF THE DRAWINGS

DETAILED DESCRIPTION

Figure 1:
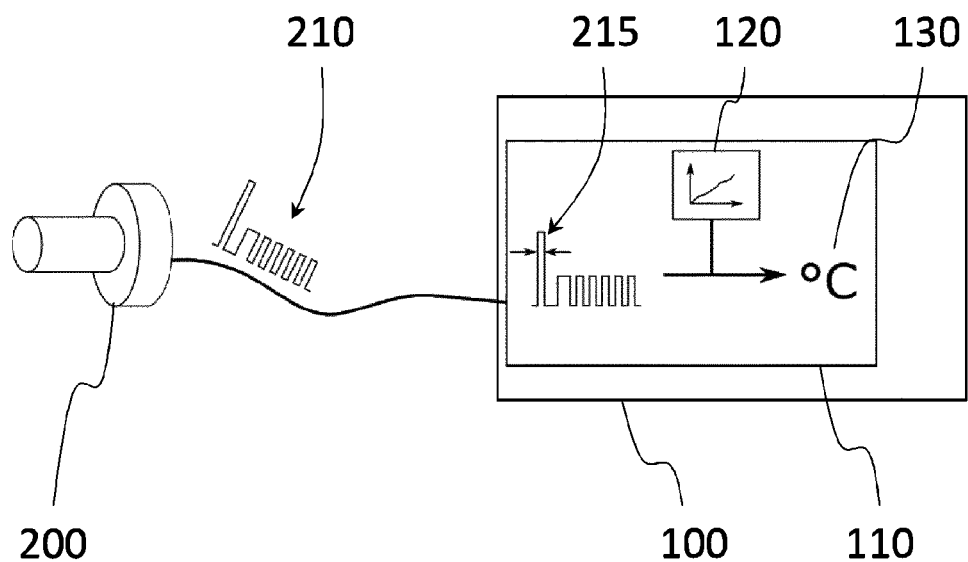
FIG. 1 shows a diagram for an exemplary embodiment of the present invention.

FIG. 1 schematically shows a device 100 for determining temperature information 130 from a sensor device 200. The sensor device 200 is electrically connected to the device 100 for the purpose of transmitting sensor information by time-limited electrical pulses 210 according to a defined protocol. The device 100 comprises a data processing unit 110 which has access to reference data 120 relating to the dependence of a pulse duration 215 on a temperature in the sensor device 200. In the diagram illustrated, the reference data are stored in a memory of the data processing unit itself, but may also be stored at a different location in the device, for example. The data processing unit 110 measures the pulse duration 215 at at least one of the electrical pulses 210. It retrieves the reference data 120 in order to determine the temperature information 130 on the basis of the result of the measurement and the reference data 120.

Figure 2:
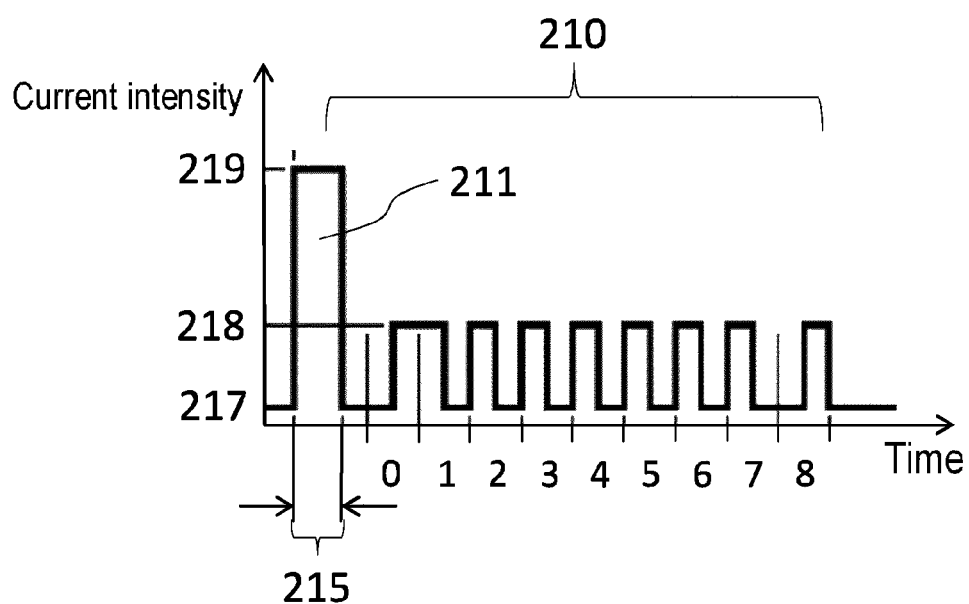
FIG. 2 shows a typical pulse sequence according to the AK protocol.

FIG. 2 shows a typical sequence of electrical pulses 210 according to the AK protocol which is used, in particular, to transmit sensor information from wheel sensors 200 (not in the image here) for wheels in vehicles. A speed sensor 200 measures a speed of a wheel, typically at a rotor 330 (not illustrated here), for instance on the basis of passes of spokes or teeth. In this case, the passes cause speed pulses 211 at a rate proportional to the speed of the wheel.

The pulses 210 transmitted by the speed sensor 200 are current pulses. Above a basic current intensity 217, transmission is effected using two current intensities. A high current intensity 219—for example 28 mA—indicates a speed pulse 211 at the start of a pulse sequence or data packet. The speed pulse 211 is followed, with a lower current intensity 218 (the output current), by nine bits of information, with the bit cell number being numbered from 0 to 8. In this case, the electrical pulses 210 typically transmit the bits using Manchester encoding. The bit cells are limited in terms of time by a duration (often denoted $t_p$ in the literature) which is typically determined by the duration or width of the speed pulse 211. Inside the bit cells, bits are coded by changing the current intensity: a logic 1 is indicated by a rising current intensity and a logic 0 is indicated by a falling current intensity, for example. The information content of the protocol typically does not comprise any temperature information from the speed sensor 200 or its environment.

The duration of the speed pulse 211 or of the bit cells can be used here as the pulse duration 215 and can be measured in the data processing unit 110 (not illustrated here). It is in a range of 50 µs±10 µs, depending on the temperature in the speed sensor 200. Speed sensors 200 in vehicles normally operate in environments which exhibit temperatures between approximately −40° C. and approximately 200° C. A resolution of approximately 12° C. per microsecond can therefore be achieved, for example, if the temperature range is utilized fully.

For advantageous use of the temperature sensing presented here, modifications of the coding or other protocols do not constitute an obstacle. Only a pulse duration 215 must be able to be measured in order to determine temperature information 130.

Figure 3:
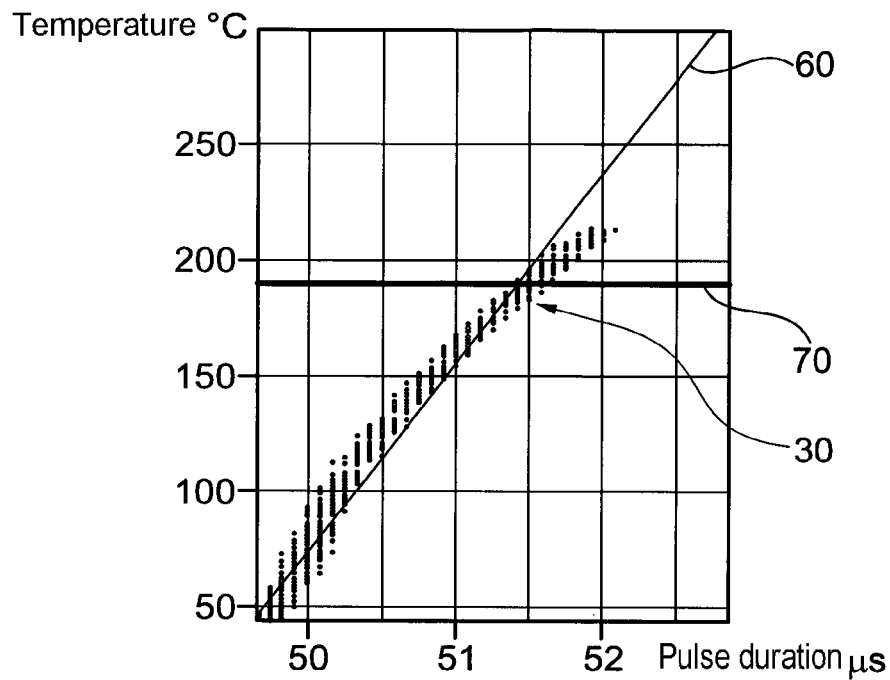
FIG. 3 shows results of a measurement series for the dependence of a pulse width on a temperature in the sensor device.

FIG. 3 shows an example of measurement results 30 for the dependence of a pulse duration 215 of the AK protocol on the temperature for a speed sensor 200 (not illustrated here in each case), as is used in the automotive sector. Illustrated alongside the measurement results 30 are a linearization straight line 60 calculated from said results and a temperature warning threshold 70.

The linearization straight line 60 has been determined by an equalization calculation from the measurement results 30 and may be used, for example, as a characteristic curve for the speed sensor 200 or another speed sensor of the same configuration. The linearization straight line 30 can also be replaced, in particular, with a more accurately adapted curve, for instance a polynomial.

If the determined temperature 130 exceeds the warning threshold 70 during operation of the speed sensor 200, the data processing unit 110 or the device 100 for determining a temperature can report this to a superordinate system, for example, or can output an alarm or a warning, for example.

Figure 4:
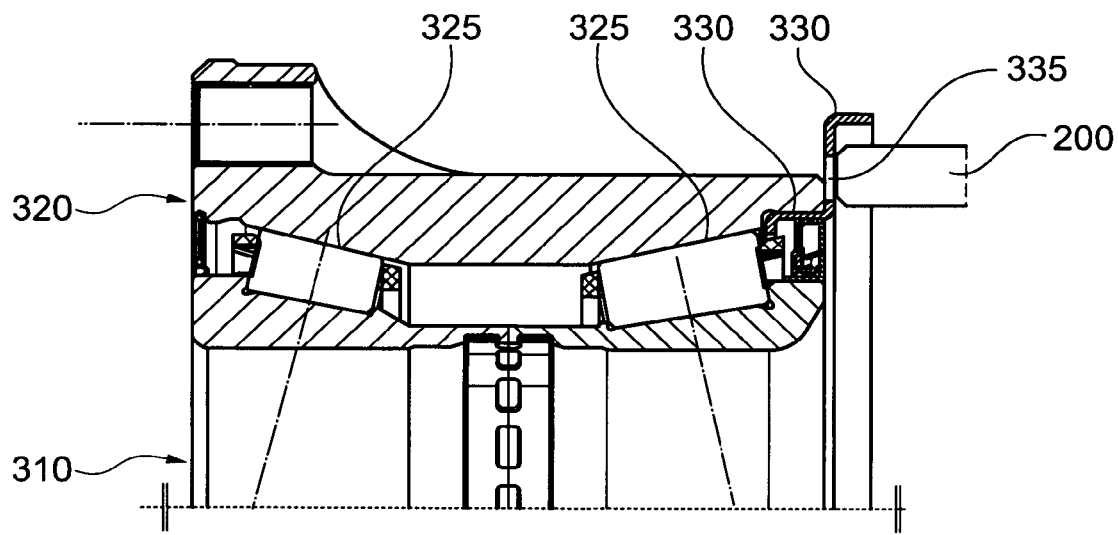
FIG. 4 shows a situation of a speed sensor in a vehicle.

FIG. 4 shows a situation of a speed sensor 200 on a wheel for a brake system in a vehicle. A cross section through a part of the wheel axle 310 and of the wheel carrier or of the wheel bearing unit 320 in a plane comprising the wheel axis of rotation can be seen. Depicted on the right-hand side is the sensor device in the form of a speed sensor 200 which determines a speed of the wheel by virtue of a rotor 330 punched from sheet metal, for example, passing through openings 335 and forwards it to an electronic control unit 100, not illustrated here, for instance the anti-lock braking system. The bearing 325 is in the form of a two-row tapered roller bearing or angular ball bearing, for example.

In order to monitor a temperature in the bearing 325, a data processing unit 110, not illustrated here, in the electronic control unit 100 can determine the temperature in the speed sensor 200 close to the bearing. Furthermore, the data processing unit 110 may also be configured infer a temperature in the bearing by predefined correction of this temperature. In contrast, a temperature measurement, for example by measurement and coded transmission in the speed sensor 200 itself or by a further sensor, would be complicated and cost-intensive on account of the necessary change to the transmission protocol or the use of further hardware in view of the complexity of the wheel module.

Figure 5:
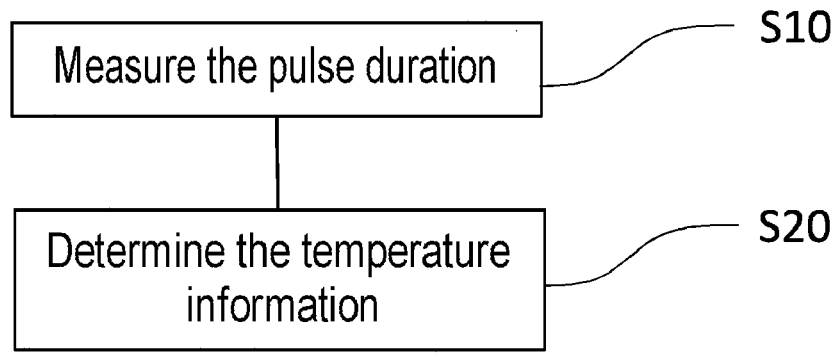
FIG. 5 shows steps of a method for measuring temperature information from a sensor using pulse widening.

FIG. 5 shows steps of a method for measuring temperature information 130 from a sensor device 200 which is configured to transmit sensor information to a receiver by time-limited electrical pulses 210 according to a defined protocol, wherein the receiver has reference data 120 relating to a relationship between a pulse duration 215 of the electrical pulses and thermal effects in the sensor device 200. A first characterizing step of the method involves measuring S10 the pulse duration 215 at least one of the electrical pulses 210. This measurement S10 is advantageously carried out in the receiver. The second characterizing step of the method involves determining S20 the temperature information 130 from at least the measured pulse duration 215 and the reference data 120. The determination may comprise further corrections in this case.

Figure 6:
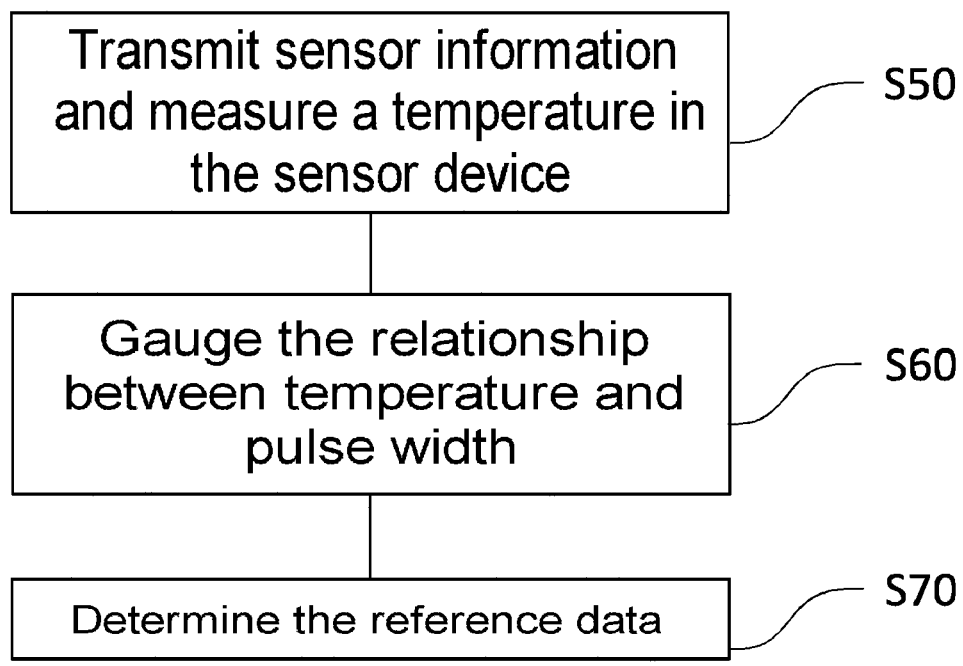
FIG. 6 shows steps of a method for generating reference data.

FIG. 6 shows steps of a method for generating reference data for a sensor device 200, which is configured to transmit sensor information to a receiver by time-limited electrical pulses 210 of an electrical current and is encapsulated with a plastic during a production method, is heated in the process and is subsequently cooled, relating to a relationship between a pulse duration 215 of the electrical pulses 210 and thermal effects in the sensor device 200. The sensor device 200 is connected, during the production method, to a provided receiver which is configured to receive the sensor information and gauge the pulse duration 215. Characterizing steps first of all then comprise repeatedly transmitting S50 sensor information from the sensor device 200 to the receiver while, at the same time, continuously measuring at least one temperature in the sensor device 200 during heating during the encapsulation with the plastic and subsequent cooling. As the next step, the data obtained are used to gauge S60 or determine the relationship between the pulse duration 215 and thermal effects in the sensor device 200 on the basis of the transmission S50 of the sensor information and the measurement of the temperature in the sensor device 200. Finally, the reference data 120 are determined S70 from at least one result of the gauging process S60.

When transmitting S50 sensor information and measuring a temperature in the sensor device 200, the content of the information is at least not necessarily important. The reference data 120 may be basic data, for instance for a characteristic curve of the relationship between the pulse width 215 and the temperature for the sensor type and/or sensor-specific data.

The features of the invention which are disclosed in the description, the claims and the figures may be important, both individually and in any desired combination, for the implementation of the invention.

THE LIST OF REFERENCE SIGNS IS AS FOLLOWS

30 Measurement results
60 Calculated linearization straight line
70 Warning threshold
100 Device for determining temperature information
110 Data processing unit
120 Reference data
123 Characteristic curve
127 Correction data
130 Temperature information
200 Sensor device
210 Electrical pulses
211 Speed pulse
215 Pulse duration
217 Basic current
218 Low current
219 High current
310 Wheel axle
320 Wheel bearing unit
325 Wheel bearing
330 Rotor
335 Rotor opening
S10 Measure the pulse duration
S20 Determine the temperature information
S50 Transmit sensor information and measure a temperature in the sensor device
S60 Gauge the relationship between temperature and pulse width
S70 Determine the reference data

The invention claimed is:

1. A device for determining temperature information from a speed sensor, comprising:
   a data processing unit configured to perform the following:
   retrieving reference data relating to a relationship between a pulse duration of time-limited electrical pulses and thermal effects in the speed sensor, wherein the speed sensor is for determining a speed in a vehicle and is configured to transmit sensor information from the speed sensor by the time-limited electrical pulses according to a defined protocol;
   measuring the pulse duration at at least one of the electrical pulses; and
   determining the temperature information based on at least the measurement and the reference data.

2. The device of claim 1, wherein the data processing unit is configured to determine the temperature information based on reference data, wherein the reference data has at least one of the following characteristics:
   specifying, for at least one pulse duration of the electrical pulses, a temperature assigned to the pulse duration, and/or
   specifying a linear relationship between a temperature and the pulse duration of the electrical pulses, and/or
   specifying a quantized or non-linear relationship between a temperature and the pulse duration of the electrical pulses, and/or
   specifying sensor-dependent correction data which define, for the sensor device, deviations from a predefined relationship between a temperature and the pulse duration of the electrical pulses.

3. The device of claim 1, wherein the data processing unit is configured, after determining the temperature information, to compare the temperature information with at least one threshold value and to trigger at least one alarm after the threshold value has been exceeded.

4. A sensor system, comprising:
   a speed sensor, for determining a speed in a vehicle, which is configured to transmit sensor information from the speed sensor by time-limited electrical pulses according to a defined protocol; and a device for determining temperature information from the speed sensor or from an environment thereof, wherein the device includes:
    a data processing unit configured to perform the following:
        retrieving reference data relating to a relationship between a pulse duration of the electrical pulses and thermal effects in the speed sensor;
        measuring the pulse duration at at least one of the electrical pulses; and
    determining the temperature information based on at least the measurement and the reference data.

5. The sensor system of claim 4, wherein the sensor information is transmitted according to a protocol which does not provide for any transmission of temperature information.

6. The sensor system of claim 4, wherein sensor information is transmitted according to the protocol of "Requirement Specifications for Standardized Interface for Wheel Speed Sensors with Additional Information-AK-Protocol Version: 4.0".

7. A vehicle, comprising:
at least one sensor system, including:
    a speed sensor, for determining a speed in a vehicle, which is configured to transmit sensor information from the speed sensor by time-limited electrical pulses according to a defined protocol; and
    a device for determining temperature information from the speed sensor or from an environment thereof, wherein the device includes:
        a data processing unit configured to perform the following:
    retrieving reference data relating to a relationship between a pulse duration of the electrical pulses and thermal effects in the speed sensor;
    measuring the pulse duration at at least one of the electrical pulses; and
    determining the temperature information based on at least the measurement and the reference data.

8. The vehicle of claim 7, wherein the data processing unit includes a predefined systematic correction in the determination of the temperature information to determine the temperature at a predefined position in the vehicle in the vicinity of the speed sensor.

9. A method for measuring temperature information from a sensor device, the method comprising:
transmitting from the sensor device sensor information, which relates to thermal effects in the sensor device, to a receiver by time-limited electrical pulses according to a defined protocol, wherein reference data is retrieved, and wherein the reference data relates to a relationship between a pulse duration of the electrical pulses and the thermal effects in the sensor device;
measuring the pulse duration at at least one of the electrical pulses; and
determining the temperature information from at least the measured pulse duration and the reference data;
wherein the sensor device is for determining a speed in a vehicle and is configured for the transmitting of the sensor information from the sensor device by the time-limited electrical pulses according to the defined protocol.

10. A method for generating reference data relating to a relationship between a pulse duration of time-limited electrical pulses and thermal effects for a sensor device, the method comprising:
transmitting sensor information from the sensor device to a receiver by the electrical pulses, the sensor device being heated during a production method and subsequently cooled, and, at the same time, continuously measuring at least one temperature in the sensor device when the sensor device is heated and subsequently cooled during the production method;
gauging the relationship between the pulse duration and thermal effects in the sensor device based on the transmission of sensor information and the measurement of the temperature in the sensor device; and
determining the reference data from at least one result of the gauging process;
wherein the sensor device is a speed sensor for a vehicle, and
wherein the reference data relates to the relationship between the pulse duration of the electrical pulses and the thermal effects in the sensor device.

11. The method of claim 10, wherein the determination of the reference data includes at least one of the following:
averaging results of repeated gauging of the relationship between the pulse duration and the thermal effects for a sensor device,
averaging results of a process of gauging the relationship between the pulse duration and the thermal effects for a plurality of sensor devices, and/or
determining a functional dependence for the relationship between the pulse duration and the thermal effects by an equalization calculation.

12. A non-transitory computer readable medium having a computer program, which is executable by a processor, comprising:
a program code arrangement having program code for measuring temperature information from a sensor device, by performing the following:
transmitting from the sensor device sensor information, which relates to thermal effects in the sensor device, to a receiver by time-limited electrical pulses according to a defined protocol, wherein reference data is retrieved, and wherein the reference data relates to a relationship between a pulse duration of the electrical pulses and thermal effects in the sensor device;
measuring the pulse duration at at least one of the electrical pulses; and
determining the temperature information from at least the measured pulse duration and the reference data;
wherein the sensor device is for determining a speed in a vehicle and is configured for the transmitting of the sensor information from the sensor device by the time-limited electrical pulses according to the defined protocol.

\* \* \* \* \*